(12) United States Patent
Bjørn et al.

(10) Patent No.: US 7,252,243 B2
(45) Date of Patent: Aug. 7, 2007

(54) INJECTION NOZZLE FOR PURIFICATION

(75) Inventors: Ingvard Bjørn, Hellerup (DK); Pär Gabrielsson, Helsingborg (SE)

(73) Assignee: Haldor Topsoe A/S, Lyngby (DK)

( * ) Notice: Subject to any disclaimer, the term of this patent is extended or adjusted under 35 U.S.C. 154(b) by 367 days.

(21) Appl. No.: 11/048,899

(22) Filed: Feb. 3, 2005

(65) Prior Publication Data
US 2005/0173553 A1      Aug. 11, 2005

(30) Foreign Application Priority Data
Feb. 5, 2004    (DK) .................. PA 2004 00175

(51) Int. Cl.
| A62C 5/02 | (2006.01) |
| A62C 31/00 | (2006.01) |
| B05B 7/12 | (2006.01) |
| B05B 7/06 | (2006.01) |
| B05B 7/04 | (2006.01) |

(52) U.S. Cl. .................. 239/8; 239/398; 239/416.4; 239/416.5; 239/418; 239/426; 239/431; 239/434

(58) Field of Classification Search .............. 239/8, 239/434, 434.5, 431, 429, 423, 424, 418, 239/421, 416.4, 416.5, 424.5, 426, 290, 291, 239/398
See application file for complete search history.

(56) References Cited

U.S. PATENT DOCUMENTS

| 3,671,025 A | * | 6/1972 | Elliott ................. 261/76 |
| 4,284,239 A | * | 8/1981 | Ikeuchi ................. 239/8 |
| 4,502,196 A | | 3/1985 | Kupper et al. |
| 5,601,792 A | | 2/1997 | Hug et al. |
| 6,048,510 A | | 4/2000 | Zauderer |

FOREIGN PATENT DOCUMENTS

| EP | 0 886 043 | 12/1998 |
| JP | 2001-152831 | 6/2001 |
| WO | WO 96/36797 | 5/1995 |
| WO | WO 2004/030827 | 4/2004 |

* cited by examiner

*Primary Examiner*—Davis Hwu
(74) *Attorney, Agent, or Firm*—Dickstein Shapiro LLP

(57) ABSTRACT

Method and apparatus for uniformly injecting a fluid stream into a gas stream at elevated temperature by means of an injection nozzle comprising a nozzle head and a supply inner tube being concentrically surrounded with an outer casing tube spaced apart from the inner supply tube. It comprises passing the fluid stream through the inner tube and the nozzle head and maintaining temperature of the fluid stream in the inner tube by providing thermal insulation in at least part of an annular space between the inner tube and the outer tube. Further it comprises maintaining a constant flow of the fluid inside the inner tube and nozzle head by plugging the nozzle head at outlet end and spraying the fluid stream through a number of nozzle holes provided in the nozzle head adjacent to the outlet end of the nozzle head.

10 Claims, 3 Drawing Sheets

INJECTION NOZZLE FOR PURIFICATION

BACKGROUND OF THE INVENTION

1. Field of the Invention

The invention relates to injection of a fluid into a gas by a nozzle. The invention is specifically directed to injection of a solution into a hot gas, where one specific use of the invention is in connection with $NO_x$ removal from exhaust gas from a diesel engine.

2. Description of Related Art

Nozzles are widely used for injection of one fluid into another, also in connection with $NO_x$ removal from engine exhaust gasses.

In WO 96/36797 patent application Hofmann et al. disclose injection of urea solution/air mixture into an exhaust gas in a vehicle. The mixture is sprayed into the exhaust gas pipe just inside the pipe close to the pipe wall so the solution does not become too hot before it is sprayed out in the gas. The distribution of the injected liquid is not uniform when seen from a cross section of the exhaust gas pipe.

Tsuneaki discloses another exhaust gas cleaning system in JP 2001152831. Here nitrogen oxides are reduced by urea solution sprayed into exhaust gas in a vehicle too. The injection nozzle is inserted through the wall of an exhaust gas pipe extending only a short distance from the inner surface, which creates an uneven flow pattern.

Kupper et al. disclose an injection nozzle for fuel in U.S. Pat. No. 4,502,196 comprising two coaxial tubes with a narrow space between filled with insulating material. The outer tube forms a hood around also the tip of the nozzle in order to keep the fuel below a temperature where formation of coke starts. The fuel is sprayed out through one hole only through both inner tube and hood in a coaxial direction with the nozzle.

Another gas cleaning method is described by Zauderer in U.S. Pat. No. 6,048,510. The content of nitrogen oxides in a flue gas in a coal fired boiler is reduced by injection of air atomised water droplets containing dissolved urea or ammonia. The droplets are injected where the temperature is optimal, and the size of the droplets is adjusted to this temperature by the nozzle construction.

However, these nozzles tend to block and none of the injections secure a very high degree of even distribution of the injected material.

It is the general object of this invention to provide a process and a nozzle for injection of an aqueous solution of a salt obtaining a stable and well distributed injection. The injection aimed at must be able to operate under all conditions without interruptions caused by blocking of the nozzle. Simultaneously, it must operate with a high degree of even distribution of the sprayed fluid in the gas, which it is sprayed into.

A process and a nozzle have now been found, so that when the nozzle is designed in accordance with the invention, a urea solution can be sprayed into exhaust gas from a vehicle obtaining a very even distribution in the exhaust gas. A nozzle of the invention operates for a long period without blocking the nozzles.

SUMMARY OF THE INVENTION

The invention is a method and apparatus for uniformly injecting a fluid stream into a gas stream at elevated temperature by means of an injection nozzle comprising a nozzle head and a supply inner tube being concentrically surrounded with an outer casing tube spaced apart from the inner supply tube. It comprises passing the fluid stream through the inner tube and the nozzle head and maintaining temperature of the fluid stream in the inner tube by providing thermal insulation in at least part of an annular space between the inner tube and the outer tube. Further, it comprises maintaining a constant flow of the fluid inside the inner tube and nozzle head by plugging the nozzle head at outlet end and spraying the fluid stream through a number of nozzle holes provided in the nozzle head adjacent to the outlet end of the nozzle head. It also comprises spraying the fluid stream through the nozzle holes in a direction being substantially at right angles to flow direction of the gas stream and adjacent to center axis of the gas stream channel, and finally uniformly distributing the sprayed fluid stream into the gas stream by a conical narrowing of the outer casing tube in region adjacent to the nozzle head.

The preferred insulating material is ceramic and formed from a thin layer of the material and rolled up to a desired shape using organic glue.

The inner tube may be equipped with a 90° bend between the end of the outer tube and the end of the inner tube.

The fluid can be a mixture of air and an aqueous solution of urea with 20-50% urea by weight, preferable 30-35% and most preferred 32.5% urea by weight.

The invention is particularly useful for uniform distribution of an aqueous solution of urea sprayed into a hot diesel exhaust gas, where water might boil off resulting in urea crystallisation. Especially advantageous is the invention in big vans and lorries.

DETAILED DESCRIPTION OF THE INVENTION

In diesel engine driven vehicles combustion takes place with a certain amount of excess air. This results in formation of nitrogen oxides, $NO_x$ in the exhaust gas, which is a serious pollution for the environment.

$NO_x$ can be reduced by ammonia, $NH_3$, which is difficult to store in vehicles, and an aqueous solution of urea, $H_2NCONH_2$, is therefor used as a reducing agent.

The ammonia is formed when urea decomposes as it is sprayed out and mixed with the hot exhaust gas according to the following reaction:

$$H_2NCONH_2 + H_2O \rightarrow 2NH_3 + CO_2$$

Urea decomposes completely only if the temperature exceeds 200° C. Thus 200° C. is the lowest temperature at which urea can be injected to the exhaust gas.

The mixture of exhaust gas and reductant, ammonia, then passes over a catalyst where the nitrogen oxides, nitrogen monoxide, NO and nitrogen dioxide, $NO_2$ reacts with the ammonia to form nitrogen and water according to the following reactions:

$$4NO + 4NH_3 + O_2 \rightarrow 4N_2 + 6H_2O, \text{ and}$$

$$6NO_2 + 8NH_3 \rightarrow 7N_2 + 12H_2O$$

During normal operation the exhaust gas shall and will be hot, simultaneously it is important that the urea solution inside the injection nozzle does not exceed the temperature where water will evaporate resulting in crystallisation of urea and blockage of injection nozzle.

The invention provides furthermore a nozzle for urea solution/air mixture injection into a hot exhaust gas without crystallisation of urea. The injection nozzle comprises an outer casing tube, a coaxial supply inner tube and an insulation material in the annular space between the two tubes. This prevents the hot exhaust gas to heat up the aqueous urea solution to the temperature, where water evaporates and urea crystallises.

In the outlet region, the inner tube is equipped with a nozzle head with plug. Very close to the plug, nozzle holes are positioned. This ensures a flow of solution in the entire volume of the inner tube, so "dead volume" is avoided, which otherwise would heat up resulting in urea crystallisation. The plug may be removed for cleaning the inner tube.

By this nozzle tip design, the solution can flow out in a right angle to the axis of the nozzle ensuring a good distribution and without risk of formation of solid urea and blocking the nozzle.

As soon as the urea solution/air mixture flows out through the nozzle holes, an aerosol is formed. When the hot exhaust gas heats the aerosol, the urea is converted to ammonia, and the ammonia reduces nitrogen oxides in the exhaust to nitrogen over a catalyst installed downstream of the nozzle.

As the catalyst is installed in the entire cross sectional area of an enlarged part of the exhaust gas pipe, uniform distribution of urea/ammonia in the pipe is very important for the conversion of nitrogen oxides.

The performance and design of the invention is made further clear by the below description of the drawings.

Figure 1:
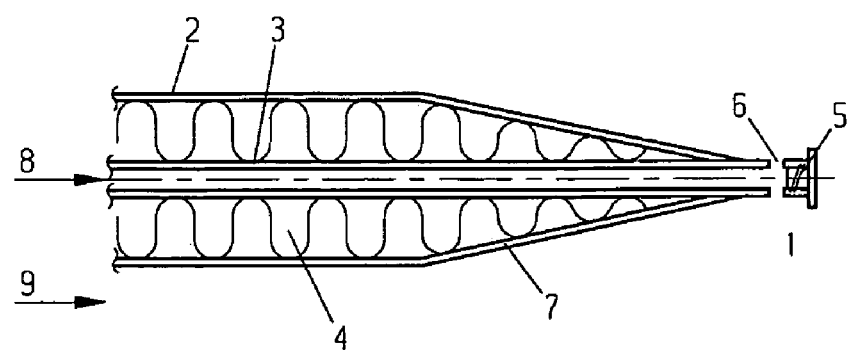
FIG. 1 is a cross section of a straight nozzle according to the invention.

One preferred embodiment of the invention is disclosed on FIG. 1, where a straight injection nozzle is shown. The nozzle comprises a nozzle head 1, an outer casing tube 2 and a coaxial supply inner tube 3, where the annular space between the tubes is filled with an insulating material 4. The insulating material 4 is formed as a solid annulus and is fitted between the inner tube 3 and the outer tube 2.

The end of the nozzle head 1 is a screw 5 having a flat end. Just next to the flat end the nozzle holes 6 are drilled, which eliminates nozzle volume without flow. The outer tube ends with a conical part 7 with the narrow part close to inner tube 3 adjacent to nozzle head 1. The urea solution/air mixture 8 flows through the inner tube 3 maintaining the low temperature, where no water evaporates and no urea crystallises. The mixture 8 flows out through the nozzle holes 6, where an aerosol is formed. In the hot exhaust gas the urea solution is converted to ammonia and carbon dioxide.

Figure 2:
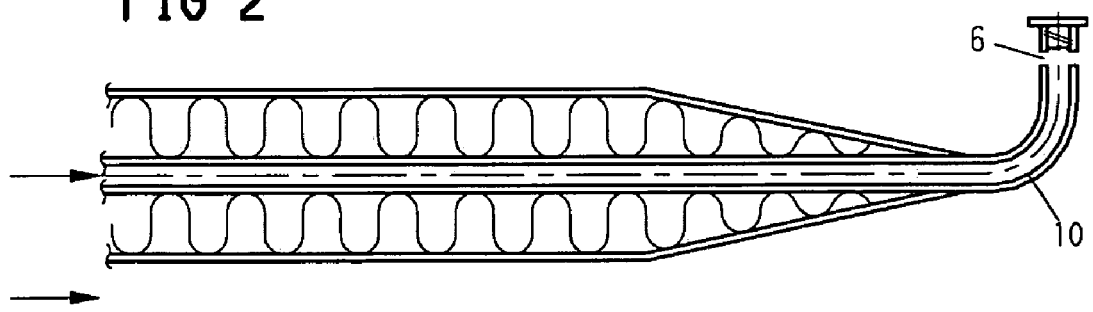
FIG. 2 is a cross section of nozzle with a 90° bend according to the invention.

Another preferred embodiment of the invention is shown on FIG. 2, which in principle is equal to the above injection nozzle except for the nozzle head, which is provided with a 90° bend 10, where 5 mm between the bend and the nozzle holes 6 are straight.

Figure 3:
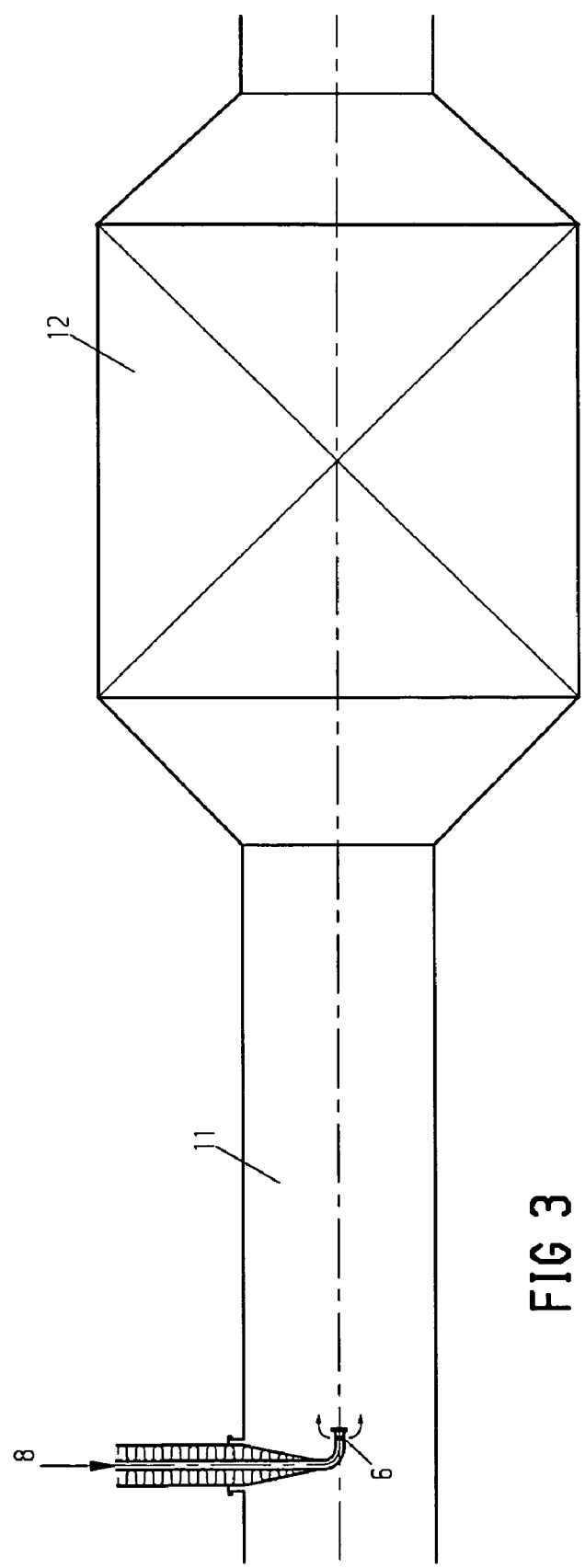
FIG. 3 is a cross section of an exhaust pipe with a nozzle according to the invention.

A preferred mode of installation is shown on FIG. 3. A nozzle with a 90° bend is inserted in a right angle through the wall of the exhaust gas pipe 11 the tip points in the exhaust gas flow direction and is coaxially installed in the middle of the exhaust gas pipe 11. In this way the urea solution flows out through the nozzle holes 6 at a right angle to the exhaust gas flow direction and in the middle of it, which results in the very good distribution.

When sprayed through the nozzle holes 6, the aqueous urea solution is converted to ammonia and carbon dioxide; this and the exhaust gas flow to a catalyst 12, where ammonia converts nitrogen oxides to nitrogen and water. Optimal conversion over the catalyst is only obtained by proper distribution of ammonia in the exhaust gas pipe.

Figure 4:
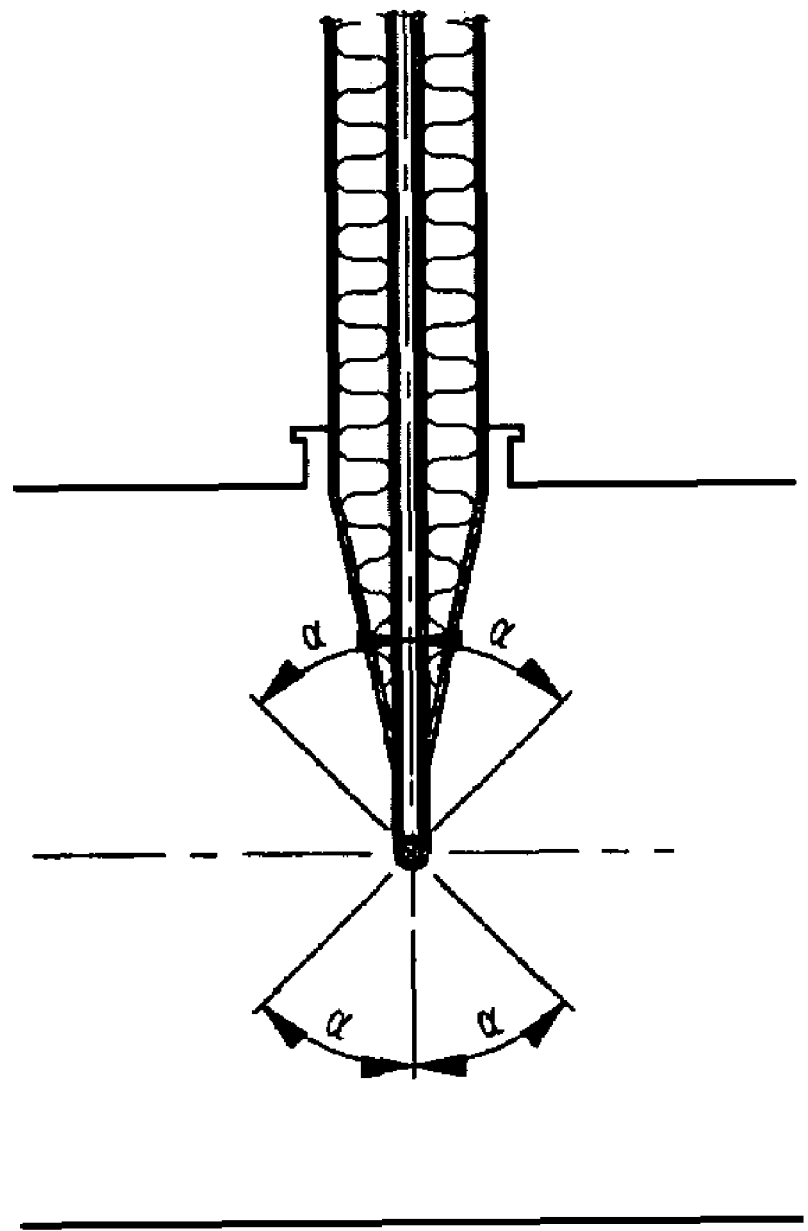
FIG. 4 is a frontal section of nozzle with a 90° bend according to the invention.

FIG. 4 shows the position of the nozzle holes when the injection nozzle is equipped with four nozzle holes. When they are drilled 45° from vertical direction, the vertical part of the injection nozzle will not disturb the exhaust gas flow coming from behind the injection nozzle.

The invention has particular use in diesel engine driven ships, trains, vans, lorries and similar, where the above toxic gases are formed and must be removed in order not to pollute the atmosphere. Removal of toxic gases will be a government requirement in an increasing number of countries, as the gases are harmful to human beings, animals and even buildings.

EXAMPLES

The dimensions of the injection nozzle are important to obtain a uniform distribution of ammonia in the exhaust gas pipe.

One preferred embodiment of the invention is manufactured with dimensions as below. The dimensions correspond to air and solution flows/consumption also given below and these figures correspond to use of the invention in an ordinary van with diesel driven engine.

When operating the engine, an air-flow of 20 Nl/min is appropriate. The urea solution consumption is adjusted to correspond to the $NO_x$ content in the exhaust gas, however, a flow of 7.5 l/hr solution is typical. The aqueous urea solution has a concentration of 20-50% as weight preferably, 30-35% and most preferred 32.5 wt % urea.

The inner tube of the corresponding injection nozzle has an outer diameter of 6 mm and a wall thickness of 1.5 mm, and the outer tube has an outer diameter of 25 mm and a wall thickness of 1.22 mm and a ceramic material is fitted between the tubes. The nozzle is equipped with four holes each with a diameter of 0.55 mm and equally spaced. For other flows the number and size of holes are adjusted accordingly, often eight holes with a diameter of 0.39 mm are used.

In a specific embodiment of the invention, the inner surface of the conical part 7 has an angle of 30° and the length of the conical part is 44.4 mm. These dimensions have proved to give a very good distribution of the reducing medium in the exhaust gas.

The insulating material in the space between the tubes is a ceramic material, which is rolled to the desired shape and kept in the shape by an organic binder. The ceramic material is commercially available under the name "Isovac" from Keramax a/s, Tølløse, Denmark.

Apart from the insulating material a suitable construction material for the nozzle is stainless steel SS 316.

Test Results

The nozzle of the invention has proved to be particular useful when employing aqueous solutions of urea which are sprayed into hot exhaust gas, especially nitrogen oxides containing diesel exhaust gas.

A Urea Selective Catalytic Reduction system was installed in September 2003 for a field test in a bus with a 4 L 150 hp diesel engine. The nozzle used for injection of urea was at the beginning of the field test just a pipe without any insulation. The bus was operating in real conditions in London city traffic.

After a short period of 2 working days, the system was found not to work. The reason was found to be urea clogging in the nozzle.

The nozzle was cleaned mechanically and the system was once again operational.

After 2 more days the nozzle was once again completely clogged by urea residues.

The conventional nozzle was replaced with a nozzle to the Haldor Topsøe A/S nozzle according to the invention with insulation around the injection pipe.

The system has then been running a total of 5 months of operation without any clogging problems.

The invention claimed is:

1. Method of uniformly injecting a fluid stream into a gas stream at elevated temperature by means of an injection nozzle comprising a nozzle head and a supply inner tube being concentrically surrounded with an outer casing tube spaced apart from the inner supply tube, which method comprises
   passing the fluid stream through the inner tube and the nozzle head and maintaining temperature of the fluid stream in the inner tube by providing thermal insulation in at least part of an annular space between the inner tube and the outer tube;
   maintaining a constant flow of the fluid inside the inner tube and nozzle head by plugging the nozzle head at outlet end and spraying the fluid stream through a number of nozzle holes provided in the nozzle head adjacent to the outlet end of the nozzle head;
   spraying the fluid stream through the nozzle holes in a direction being substantially at right angles to flow direction of the gas stream and adjacent to center axis of the gas stream channel; and
   uniformly distributing the sprayed fluid stream into the gas stream by conically narrowing the outer casing tube in region adjacent to the nozzle head.

2. Method of claim 1, wherein the gas stream is an exhaust gas stream from a Diesel engine and the fluid stream is an aqueous solution containing between 20% and 50% by weight, preferably between 30% and 35% by weight of urea.

3. Method of claim 2, wherein the aqueous solution is passed to the nozzle head by pressurized air.

4. Injection nozzle for use in a method according to anyone of the preceding claims comprising a nozzle head being connected to a fluid stream supply tube, wherein the supply tube is concentrically and spaced apart surrounded by an outer casing tube;
   space between the supply tube and the casing tube is at least partly filled with thermal insulation material;
   the outer casing tube is conically narrowed to adjacent to outer wall of the supply inner tube in region adjacent to the nozzle head;
   the nozzle head is plugged at outlet end with a plug; and
   the nozzle head is provided with a number of equally spaced nozzle holes in region adjacent to the plug of the nozzle head.

5. Injection nozzle of claim 4, wherein the sizes of outer diameter and inner diameter of the nozzle head are identical to sizes of outer diameter and inner diameter of the supply tube.

6. Injection nozzle of claim 4, wherein the nozzle head is a tube equipped with a 90° bend between the supply tube and the nozzle holes.

7. Injection nozzle of claim 6, wherein the straight part of the nozzle head between the bend and the nozzle holes has a length of 5 mm.

8. Injection nozzle of claim 4, wherein the thermal insulation material is a ceramic compound.

9. Injection nozzle of claim 4, wherein the inner surface of the conically narrowed part of the outer casing tube has an angle of 30°.

10. Injection nozzle of claim 4, wherein the supply tube has an outer diameter of 6 mm and a wall thickness of 1.5 mm, the outer casing tube has an outer diameter of 25 mm and a wall thickness of 1.22 mm, and the nozzle head is equipped with four equally spaced holes each with a diameter of 0.55 mm or with eight equally spaced holes each with a diameter of 0.39 mm.

* * * * *